US010977432B2

(12) United States Patent
Lu et al.

(10) Patent No.: US 10,977,432 B2
(45) Date of Patent: Apr. 13, 2021

(54) METHOD FOR CONCLUDING ELECTRONIC CONTRACTS AND SERVER

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 99 days.

(21) Appl. No.: 16/307,167

(22) PCT Filed: Jul. 21, 2017

(86) PCT No.: PCT/CN2017/093921
§ 371 (c)(1),
(2) Date: Dec. 5, 2018

(87) PCT Pub. No.: WO2018/019187
PCT Pub. Date: Feb. 1, 2018

(65) Prior Publication Data
US 2019/0147027 A1    May 16, 2019

(30) Foreign Application Priority Data
Jul. 25, 2016  (CN) .......................... 201610592410.9

(51) Int. Cl.
G06F 40/171      (2020.01)
G06F 21/64       (2013.01)
(Continued)

(52) U.S. Cl.
CPC ............ G06F 40/171 (2020.01); G06F 21/64 (2013.01); G06K 9/00456 (2013.01);
(Continued)

(58) Field of Classification Search
CPC ...... G06F 40/171; G06F 21/64; G06F 21/645; G06K 9/00456; G06K 2209/01; G06K 9/00442; G06Q 50/188; G06Q 50/167
See application file for complete search history.

(56) References Cited

U.S. PATENT DOCUMENTS

2007/0250337 A1    10/2007  Karamchedu et al.
2014/0168716 A1*   6/2014   King ..................... G06Q 10/10
                                                  358/473
(Continued)

Primary Examiner — Quoc A Tran
(74) Attorney, Agent, or Firm — Hammer & Associates, P.C.

(57) ABSTRACT

A method for concluding electronic contracts and a server, comprising: a server receiving a contract file sent by a first client, converting said contract file into a contract image, and generating a contract identifier associated with said contract file and said contract image, then sending said contract identifier and said contract image to said first client; the server receiving the contract identifier, signing location information and signatory identity information sent by the first client, and sending said contract identifier, and the contract image and signing location information associated with the contract identifier to a second client; the server receiving said contract identifier and signature image sent by the second client, and writing the signature image into the contract file associated with said contract identifier according to said signing location information. By means of the present invention, signing electronic contracts avoids the issue of time and place constraints, is convenient and quick, and reduces the waste of resources, resulting in an indisputable signature.

22 Claims, 6 Drawing Sheets

(51) Int. Cl.
*G06K 9/00* (2006.01)
*G06Q 50/18* (2012.01)
*G06Q 50/16* (2012.01)
*G06F 17/00* (2019.01)

(52) U.S. Cl.
CPC ......... *G06Q 50/188* (2013.01); *G06F 21/645* (2013.01); *G06K 9/00442* (2013.01); *G06K 2209/01* (2013.01); *G06Q 50/167* (2013.01)

(56) References Cited

U.S. PATENT DOCUMENTS

| | | | |
|---|---|---|---|
| 2014/0181969 A1* | 6/2014 | Mousty | H04L 63/02 |
| | | | 726/23 |
| 2016/0224528 A1* | 8/2016 | Trevarthen | G06F 3/04883 |
| 2017/0063551 A1* | 3/2017 | Quinn | H04L 9/0643 |
| 2017/0116669 A1* | 4/2017 | Wickstrom | G06Q 10/1097 |
| 2017/0270320 A1* | 9/2017 | Petrogiannis | G06F 21/30 |
| 2017/0337172 A1* | 11/2017 | Dunn | G06F 40/174 |

* cited by examiner

PREMISES LEASE CONTRACT

Lessor (hereinafter referred as Party A):

Lessee (hereinafter referred as Party B):

In respect of leasing house from Party A to Party B, both parties conclude the following contract:

1. Party A agrees to lease the property, located at room 201, building No.9, huayuan community, Xueyuanlu street, to Party B for residential use, the lease term will be from January 1st, 2016 to December 31st, 2016, amounting 12 months.

2. The rental fee will be RMB 2000 yuan per month, and the rental fee should be paid by month/quarter/year.

3. During the term of tenancy, party b is responsible for paying the charges in relation to water, electricity, heating, gas, telephone charges and property fee on the basis of the amount of such utilities party b uses. Such charges shall be paid when the rental is finished.

4. Party B agrees to pay RMB 2000 yuan as deposit, which will be charged as the rental fee when the contract is terminated.

5. The tenancy shall be for a term of one year, commencing on Jan 1st, 2016 and expiring on Dec 31st, 2016. During the term of tenancy, if one of the parties asks for terminate the contract, one should note the other party three month in advance, and pay the penalty of the rental fees of 2000 to the other party; if Party A transfers the property, Party B has priority to buy it.

Party A: _____   Party B: _____

Fig. 4

PREMISES LEASE CONTRACT

Lessor (hereinafter referred as Party A):

Lessee (hereinafter referred as Party B):

In respect of leasing house from Party A to Party B, both parties conclude the following contract:

1. Party A agrees to lease the property, located at room 201, building No.9, huayuan community, Xueyuanlu street, to Party B for residential use, the lease term will be from January 1st, 2016 to December 31st, 2016, amounting 12 months.

2. The rental fee will be RMB 2000 yuan per month, and the rental fee should be paid by month/quarter/year.

3. During the term of tenancy, party b is responsible for paying the charges in relation to water, electricity, heating, gas, telephone charges and property fee on the basis of the amount of such utilities party b uses. Such charges shall be paid when the rental is finished.

4. Party B agrees to pay RMB 2000 yuan as deposit, which will be charged as the rental fee when the contract is terminated.

5. The tenancy shall be for a term of one year, commencing on Jan 1st, 2016 and expiring on Dec 31st, 2016. During the term of tenancy, if one of the parties asks for terminate the contract, one should note the other party three month in advance, and pay the penalty of the rental fees of 2000 to the other party; if Party A transfers the property, Party B has priority to buy it.

Party A:    Party B: 

Fig. 5

PREMISES LEASE CONTRACT

Lessor (hereinafter referred as Party A):

Lessee (hereinafter referred as Party B):

In respect of leasing house from Party A to Party B, both parties conclude the following contract:

1. Party A agrees to lease the property, located at room 201, building No.9, huayuan community, Xueyuanlu street, to Party B for residential use, the lease term will be from January 1st, 2016 to December 31st, 2016, amounting 12 months.

2. The rental fee will be RMB 2000 yuan per month, and the rental fee should be paid by month/quarter/year.

3. During the term of tenancy, party b is responsible for paying the charges in relation to water, electricity, heating, gas, telephone charges and property fee on the basis of the amount of such utilities party b uses. Such charges shall be paid when the rental is finished.

4. Party B agrees to pay RMB 2000 yuan as deposit, which will be charged as the rental fee when the contract is terminated.

5. The tenancy shall be for a term of one year, commencing on Jan 1st, 2016 and expiring on Dec 31st, 2016. During the term of tenancy, if one of the parties asks for terminate the contract, one should note the other party three month in advance, and pay the penalty of the rental fees of 2000 to the other party; if Party A transfers the property, Party B has priority to buy it.

Party A: _____     Party B: 

Fig. 6

PREMISES LEASE CONTRACT

Lessor (hereinafter referred as Party A):

Lessee (hereinafter referred as Party B):

In respect of leasing house from Party A to Party B, both parties conclude the following contract:

1. Party A agrees to lease the property, located at room 201, building No.9, huayuan community, Xueyuanlu street, to Party B for residential use, the lease term will be from January 1st, 2016 to December 31st, 2016, amounting 12 months.

2. The rental fee will be RMB 2000 yuan per month, and the rental fee should be paid by month/quarter/year.

3. During the term of tenancy, party b is responsible for paying the charges in relation to water, electricity, heating, gas, telephone charges and property fee on the basis of the amount of such utilities party b uses. Such charges shall be paid when the rental is finished.

4. Party B agrees to pay RMB 2000 yuan as deposit, which will be charged as the rental fee when the contract is terminated.

5. The tenancy shall be for a term of one year, commencing on Jan 1st, 2016 and expiring on Dec 31st, 2016. During the term of tenancy, if one of the parties asks for terminate the contract, one should note the other party three month in advance, and pay the penalty of the rental fees of 2000 to the other party; if Party A transfers the property, Party B has priority to buy it.

Party A: _____     Party B: 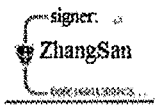

Fig. 7

PREMISES LEASE CONTRACT

Lessor (hereinafter referred as Party A):

Lessee (hereinafter referred as Party B):

In respect of leasing house from Party A to Party B, both parties conclude the following contract:

1. Party A agrees to lease the property, located at room 201, building No.9, huayuan community, Xueyuanlu street, to Party B for residential use, the lease term will be from January 1st, 2016 to December 31st, 2016, amounting 12 months.

2. The rental fee will be RMB 2000 yuan per month, and the rental fee should be paid by month/quarter/year.

3. During the term of tenancy, party b is responsible for paying the charges in relation to water, electricity, heating, gas, telephone charges and property fee on the basis of the amount of such utilities party b uses. Such charges shall be paid when the rental is finished.

4. Party B agrees to pay RMB 2000 yuan as deposit, which will be charged as the rental fee when the contract is terminated.

5. The tenancy shall be for a term of one year, commencing on Jan 1st, 2016 and expiring on Dec 31st, 2016. During the term of tenancy, if one of the parties asks for terminate the contract, one should note the other party three month in advance, and pay the penalty of the rental fees of 2000 to the other party; if Party A transfers the property, Party B has priority to buy it.

Party A: signer: LiSi   Party B: signer: ZhangSan

Fig. 8

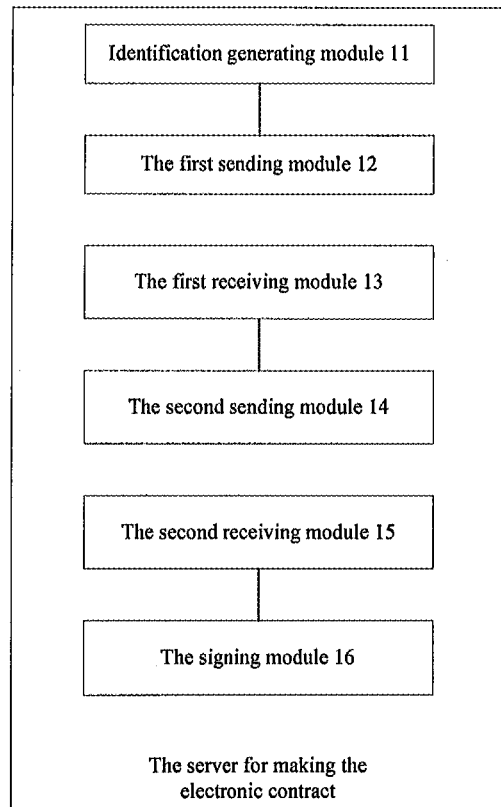

Fig. 9

METHOD FOR CONCLUDING ELECTRONIC CONTRACTS AND SERVER

TECHNICAL FIELD

The present invention relates to a method for making an electronic contract and a server thereof, which belongs to the field of electronic business.

PRIOR ART

Generally speaking, a traditional contract is signed or sealed by parties involved, thus, the signing of the contract is restricted by time or location, and because the contract is made of paper, it is a waste of resource. With the development of electronic technology, more and more traditional contracts are replaced by the electronic contracts, an electronic contract is a protocol for establishing, changing or terminating a relation between civil rights and obligations which relate to property, and the electronic contact is reached by both parties in an electronic manner via electronic information network. On one hand, the electronic contract is convenient, efficient and not limited by the time or location; on the other hand, because the openness of the internet, the electronic contract may be tampered or intercepted in its transmission process, which is a threat to both parties involved.

SUMMARY OF THE INVENTION

The object of the present invention is to provide a method for making an electronic contract and a server thereof, which prevent parties who need to sign a contract from being limited by time or location through signing the electronic contract, on one hand, the method provides a more convenient and faster way for signing a contract; on the other hand, it is also resource-friendly and it can protect the contract from being tampered in the process of being signed.

Thus, according to one aspect of the present invention, there is provided a method for making an electronic contract, including:

Step A1, sending, by a first client, a contract document to a server;

Step A2, converting, by the server, the contract document to a contract picture, generating a contract identification which relates to the contract document and the contract picture, and sending the contract identification and the contract picture to the first client;

preferably, Step A2 can be: converting, by the server, the contract document to the contract picture according to a preset converting relation, generating the contract identification and one picture identification correspond to each picture identification, all of the contract pictures relate to both the contract identification and the contract document, and sending the contract identification, the picture identification and the contract picture to the first client;

Step A3, generating, by the first client, sign position information according to the sign position set by a contractor in the contract picture, building a corresponding relation among the contract identification, the sign position information and the identity information of a signer which is entered by the party who makes the contract, and sending the contract identification, the sign position information and the identity information of the signer to the server;

Step A3 specifically includes:

Step 301, sending, by the first client, the information of the signer entered by the contractor to the server;

the information of the signer including the identity information of signer and a code of signer, or the identity information of signer and authentication type; or the identity information of signer, the code of signer, and authentication type;

Step 302, generating, by the server, a signer identification which relates to the information of the signer, and sending the signer identification to a second client;

Step 303, receiving, by the second client, a sign position set by the contractor according to the signer identity information, generating sign position information according to the sign position set by the contractor in the contract picture; building a corresponding relation among the contract identification and the sign position information which relate to the contract identification and a contract identification which relates to the signer identity information, and sending them to the server;

preferably, generating the sign position information according to the sign position set by the contactor in the contact picture specifically includes: generating the sign position information according to a coordinate information of the contract picture identification and the sign position of the contract picture in which the sign position information is.

Preferably, Step A4, sending, by the server, the contract identification, the contract picture and the signer position information to the second client according to the signer identity information;

in the case that the signer identity information specifically is signer contact information, Step A4 specifically includes:

Step 101, sending, by the server, a sign reminder which includes the contract identification to the second client according to the signer contract information;

Step 102, receiving, by the second client, the trigger information of the sign reminder sent by the signer, and sending the contract identification to the server;

Step 103, obtaining, by the server, the sign position information and the contract picture according to the contract identification and the signer contact information, and sending the sign position information and the contract picture to the second client.

Preferably, in the case that the signer identity information specifically is a username used by the signer when he/she logins an application system;

Step A4 specifically includes:

Step 201, starting, by the second client, the application system, receiving the username and a password entered by the signer, and sending the username and the password to the server;

Step 202, determining, by the server, whether the signer identity is legitimate according to the username and the password, obtaining the sign position information and the contract identification according to the username when the signer identity is legitimate, and sending the contract identification, the contract picture relating to the contract identification and the sign position information to the second client.

Furthermore, in the case that the signer information includes the code of signer, Step A4 specifically includes:

Step 401, determining, by the server, whether there is a sequence for signing according to the code of signer in the signer information, if yes, going to Step 403; otherwise, going to Step 402;

Step 402, sending, by the server, the contract identification to all the second clients according to the signer identity information in multiple of signer information;

Step 403, obtaining, by the server, the signer information as a current signer information according to the sequence of the code of signer, sending the contract identification, the contract picture and signer position information to the second client according to the signer identity information in the current signer information;

after Step A6, the method further includes: the server determining whether there is signer information which has not been obtained, if yes, returning to Step 403; otherwise, ending the procedure.

Preferably, in the case that the signer information includes authentication type, specifically, authentication type can be facial authentication, real-name authentication, fingerprint authentication or text message authentication.

Preferably, after Step A3 and before Step A4, the method further includes:

Step 501, obtaining, by the server, authentication type from the signer information, and sending a link of authentication page to the second client according to authentication type;

Step 502, loading and displaying, by the second client, the identity authentication page according the link of authentication page, receiving the identity authentication information entered by the signer, and sending the identity authentication information to the server;

Step 503, determining, by the server, whether the signer identity is legitimate according to the identity authentication information, if yes, going to Step A4; otherwise, sending a reminder that the identity is authenticated unsuccessfully to the second client, ending the procedure.

Preferably, Step A5, displaying, by the second client, a sign position in the contract picture according to the sign position information, and receiving a sign picture uploaded by the signer or a sign picture issued by the server; sending the contract identification of the contract picture to the server, and sending the sign picture to the server in the case that the sign picture uploaded by the signer is received;

Step A6, obtaining, by the server, a contract document according to the contract identification, and writing the sign picture into the contract document according to the sign position information.

Preferably, there is digital certificate corresponding to the signer identity information pre-stored in the server;

After Step A6, the method further includes: obtaining, by the server, the digital certificate according to the signer identity information, and writing the digital certificate into the contract document.

Preferably, after Step A1 and before Step A2, the method further includes:

Step 601, determining, by the server, whether a format of the contract document is a preset format, if yes, going to Step A2; otherwise, going to Step 602;

Step 602, determining, by the server, whether the format of the contract document can be changed into the preset format, if yes, the server changing the format of the contract document into the preset format, going to Step A2; otherwise, sending information that the format of the contract document is not supportive to the first client.

It needs to be noted that the first client and the second client can be the same client.

According to the other aspect of the present invention, there is provided a server for making an electronic contract, including:

an identification generating module which is configured to receive a contract document sent by the first client, convert the contract document into a contract picture, and generate a contract identification which relates to the contract document and the contract picture;

the identification generating module specifically includes:

a fifth receiving sub-module which is configured to receive the contract document which is sent by the first client;

a first converting sub-module which is configured to convert the contract document which is received by the fifth receiving sub-module into the contract picture according to a preset converting relationship;

an identification generating sub-module which is configured to generate the contract identification and the picture identification; the contract identification and the contract document relate to all of the contract picture, and each contract picture corresponds to one picture identification.

Preferably, the sign position information received by the first receiving module specifically includes the picture identification and the coordinate information of sign position of the sign position in the contract picture.

A first sending module which is configured to send the contract identification and the contract picture generated by the identification generating module to the first client;

a first receiving module which is configured to receive the contract identification, the sign position information and the signer identity information sent from the first client;

the first receiving module specifically includes:

a third receiving sub-module which is configured to receive the contract identification, the sign position information and the signer information sent from the first client, and to generate a signer identification which relates to the signer information;

the signer information includes: the signer identity information and the signer code; or the signer identity information and authentication type; or the signer identity information, the signer code and authentication type;

a fourth sending sub-module which is configured to send the signer identification received by the third receiving sub-module to the first client;

a fourth receiving sub-module which is configured to receive the contract identification, the signer identification and the signer position information sent from the first client.

Preferably, the second sending module which is configured to send the contract identification, the contract picture which relates to the contract identification and the signer position information to the second client according to the signer identity information received by the first receiving module;

in the case that the signer identity information received by the first receiving module specifically is the contact information of the signer, the second sending module specifically includes:

a first sending sub-module which is configured to send the sign reminder including the contract identification to the second client according to the contact information of the signer received by the first receiving module;

a first receiving sub-module which is configured to receive the contract identification sent by the second client;

a second sending sub-module which is configured to obtain the sign position information and the contract picture according to the contract identification and the contact information of the signer received by the first receiving sub-module, and to send the contract picture and the sign position information to the second client.

Preferably, in the case that the signer identity information received by the first receiving module specifically is a username of the signer when he/she logins the application system, the second sending module specifically includes:

a second receiving sub-module which is configured to receive the username and the password sent by the second client;

a first determining sub-module which is configured to determine whether the identity of the signer is legitimate according to the username and the password received by the first receiving module;

a third sending sub-module which is configured to obtain the sign position information and the contract identification according to the username and send the contract identification, the contract picture relating to the contract identification and the sign position information to the second client, in the case that the first determining sub-module determines that the identity of the signer is legitimate.

Preferably, in the case that the signer information received by the third receiving sub-module includes the signer identity information and the signer code, or the signer identity information, the signer code and the authentication type, a second sending module specifically includes:

a second determining sub-module which is configured to determine whether there is a sign sequence according to the signer code in the signer information;

a fifth sending sub-module which is configured to send the contract identification to all of the second clients according to the signer identity information in the signer information in the case that the second determining sub-module determines there is not a sign sequence;

a first obtaining sub-module which is configured to obtain the signer information as a current signer information in order according to the signer code in the case that the second determining sub-module determines that there is sign sequence; and obtain in order the signing information as the current signing information according to the signer code in the case that the first determining module determines that there is signer information which has not been obtained;

a sixth sending sub-module which is configured to send the contract identification, the contract picture and the signer position information to the second client according to the signer identity information in the current signer information obtained by the first obtaining sub-module;

preferably, the server further includes: a first determining module which is configured to determine whether there is signer information which is not been obtained.

The signer information received by the third receiving sub-module includes the signer identity information and authentication type; or the signer identity information, the signer code and authentication type;

the server further includes:

a third sending module which is configured to obtain authentication type from the signer information which is received by the third receiving sub-module, and send a link of an authentication page to the second client according to authentication type;

a second determining module which is configured to receive identity authentication information sent from the second client, and to determine whether the signer identity is legitimate according to the identity authentication information;

a second sending module which is specifically configured to send the contract identification, the contract picture relating to the contract identification and the signer position information to the second client according to the signer identity information received by the first receiving module in the case that the second determining module determines that the signer identity is legitimate;

a fourth sending module which is configured to send information that the identity is authenticated unsuccessfully to the second client in the case that the second determining module determines the signer identity is illegitimate.

Specifically, authentication type in the signer information received by the third receiving sub-module specifically includes the facial authentication, real-name authentication, fingerprint authentication or text message authentication.

Preferably, the second receiving module is configured to receive the contract identification sent from the second client, and to receive the contract identification and the sign picture sent from the second client;

a signing module which is configured to write the sign picture pre-stored in the server into the contract document which relates to the contract identification according to the sign position information in the case that the second receiving module receives the contract identification, and to write the sign picture pre-stored in the server into the contract document in the case that the second receiving module receives the contract identification and the sign picture.

Preferably, the server further includes:

a storing module which is configured to store a digital certificate corresponding to the signer identity information;

a digital-certificate-writing module which is configured to obtain the digital certificate from the storing module according to the signer identity information, and to write the digital certificate into the contract document obtained by the signing module.

Furthermore, the server includes:

a third receiving module which is configured to receive a contract authentication picture sent from the second client;

a third determining module which is configured to obtain the contract document according to the contract identification received by the second receiving module, to compare the contract authentication picture received by the third receiving module with the contract document and determine whether the contract authentication picture is same as the contract document;

the third determining module can include:

a fourth determining sub-module which is configured to determine whether resolution of the contract authentication picture received by the third receiving module is greater than a preset value;

a fifth determining sub-module which is configured to compare the contract authentication picture received by the third receiving module with the contract document in the case that the fourth determining sub-module determines that the resolution of the contract authentication picture received by the third receiving module is greater than the preset value, and determines whether the contract authentication picture is as same as the contract document; and an eighth sending sub-module which is configured to send information that the contract authentication picture is not qualified to the second client in the case that the fifth determining sub-module determines that the resolution of the contract authentication picture received by the third receiving module is not greater than the preset value.

Correspondingly, the signing module is specifically configured to write the sign picture received by the second receiving module into the contract document obtained by the third determining module according to the sign position information in the case that the third determining module determines that the contract authentication picture is as same as the contract document;

the third determining module can also include:

a sixth determining sub-module which is configured to operate optical character recognition on the contract authentication picture received by the third receiving module, to make words statistics on the words which is obtained by recognition, and to determine whether the number of the words in the contract authentication picture is more than a preset value;

a seventh determining sub-module which is configured to compare the contract authentication picture received by the third receiving module with the contract document in the case that the sixth determining sub-module determines that the number of words in the contract authentication picture received by the third receiving module is more than the preset value, and to determine whether the contract authentication picture is as same as the contract document;

a ninth sending sub-module which is configured to send information that the contract authentication picture is not qualified to the second client in the case that the seventh determining sub-module determines that the number of the words in the contract authentication picture received by the third receiving module is not more than the preset value; and a sixth sending module which is configured to send information that the contract is falsified to the second client in the case that the third determining module determines that the contract authentication picture is not as same as the contract document.

According to the present invention, it provides a convenient way for signing a contract by signing an electronic contract, in this way, two parties involved can be not limited by the location and the time on one hand, and it is environmentally friend on the other hand; the present invention avoids the electronic contract from being falsified during its transformation, that means the contract the party signs is the same contract which is he/she gets.

BRIEF DESCRIPTION OF THE DRAWINGS

The present invention will now be described more simply by way of example, and it will be apparent that the following description is merely of some embodiments of the invention and that, for those skilled in the art, other drawings may be obtained from these drawings.

FIG. 4 provides a contract picture before a contractor sets a sign position according to Embodiment 2 of the present invention;

FIG. 5 provides a setting page after the contractor sets the sign position according to Embodiment 2 of the present invention;

FIG. 6 provides a contract signing page before Zhang San signs the contract according to Embodiment 2 of the present invention;

FIG. 7 provides a contract picture after Zhang San signed the contract according to Embodiment 2 of the present invention;

FIG. 8 provides a contract picture after all of the parties involved sign the contract according to Embodiment 2 of the present invention;

FIG. 9 provides a block diagram of a server for making an electronic contract according to Embodiment 3 of the present invention.

DETAILED DESCRIPTION OF EMBODIMENTS

The technical solution in the Embodiment of the present invention is further described more clearly and completely with the drawings of the present invention. Apparently, Embodiments described herein are just a few Embodiments of the present invention. On the basis of Embodiments of the invention, all other related Embodiments made by those skilled in the art without any inventive work belong to the scope of the invention.

Embodiment 1

Figure 1:
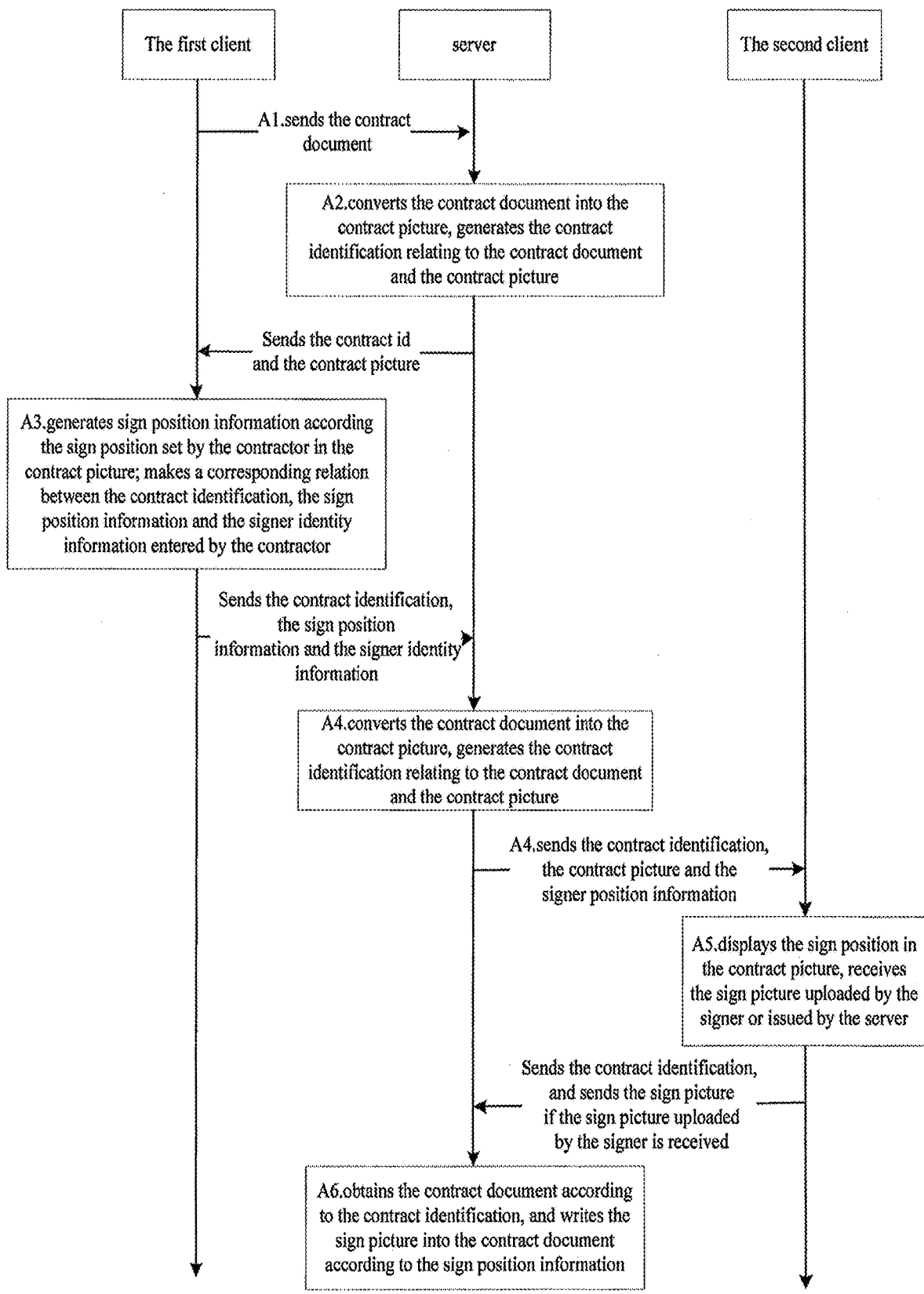
FIG. 1 provides a flow chart of a method for making an electronic contract according to the Embodiment 1 of the present invention.

It provides a method for making an electronic contract, as shown in FIG. 1, including:

Step A1, a first client sends a contract document to a server;

Step A2, the server converts the contract document into a contract picture, generates a contract identification relating to the contract document and the contract picture, and sends the contract identification and the contract picture to the first client;

preferably, Step A2 can include: the server converts the contract document into the contract picture according to a preset converting relation, generates the contract identification, and generates picture identification corresponding to each contract picture, relates the contract identification and the contract document to all of the contract picture, and sends the contract identification, the picture identification and the contract picture to the first client;

Step A3, the first client generates a sign position information according a sign position set by a contractor in the contract picture, and builds a corresponding relation among the contract identification, the sign position information and signer identity information entered by the contractor and sends the contract identification, the sign position information and the signer identity information entered by the contractor to the server;

Step A3 specifically includes:

Step 301, the first client sends signer information entered by the contractor to the server;

the signer information specifically includes: the signer identity information and a signer code; or the signer identity information and an authentication type; or the signer identity information, the signer code and the authentication type;

Step 302, the server generates a signer identification relating to the signer information, and sends the signer identification to the second client;

Step 303, the second client receives a sign position set by the contractor according to the signer identity information, generates the sign position information according to the sign position set by the contactor in the contract picture; builds a corresponding relation among contract identification, the sign position and the signer identification which relates to the signer identity information, and sends the contract identification, the sign position and the signer identification to the server;

preferably, generating the sign position information according the sign position set by the contractor in the contract picture specifically includes: the sign position information is generated according to a picture identification of the sign position information in the contract picture and coordinate information of the sign position.

Step A4, the server sends the contract identification, the contract picture, and the signer position information to the second client according to the signer identity information;

in the case that, the signer identity information is specifically contact information of the signer, Step A4 specifically includes:

Step 101, the server sends a signing reminder which includes the contract identification to the second client according to the contact information of the signer;

Step 102, the second client sends the contract identification to the server when triggering information of the signing reminder is received from the signer;

Step 103, the server obtains the sign position information and the contract picture according to the contract identification and the contact information of the signer, and sends the contract picture and the sign position information to the second client.

In the case that the signer identity information specifically is a username via which the signer logins the application system, Step A4 specifically includes:

Step 201, the second client starts the application system, receives the username and a password entered by the signer, and sends the username and the password to the server;

Step 202, the server obtains the sign position information and the contract identification according to the username after the server determines that the signer identity information is legitimate according to the username and the password, and then sends the contract identification, the contract picture and the sign position information, both of which relate to the contract identification, to the second client.

Furthermore, in the case that the signer information includes the signer code,

Step A4 specifically includes:

Step 401, the server determines whether there is a signing sequence according to the signer code in the signer information, if yes, goes to Step 403; otherwise, goes to Step 402;

Step 402, the server sends the contract identification to the second client according to the signer identity information in multiple of the signer information;

Step 403, the server obtains the signer information as the current signer information according to a signer code sequence, and sends the contract identification, the contract picture and the signer position information the second client according to the signer identity information in the current signer information;

after Step A6, the method further includes the server determines whether there is any signer information which is not obtained, if yes, returns to Step 403; otherwise, the procedure ends.

Preferably, in the case that the signer information includes authentication type, specifically, authentication type can be facial authentication, real-name authentication, fingerprint authentication or text message authentication.

After Step A3 and before Step A4, the method further includes:

Step 501, the server obtains authentication type from the signer information, and send a link of authentication page to the second client according to authentication type;

Step 502, the second client loads and displays the identity authentication page according the link of authentication page, receives the identity authentication information entered by the signer, and sends the identity authentication information to the server;

Step 503, the server determines whether the signer identity is legitimate according to the identity authentication information, if yes, goes to Step A4; otherwise, sends a reminder that the identity is authenticated unsuccessfully to the second client, ends the procedure.

Step A5, the second client displays a sign position in the contract picture according to the sign position information, and receives a sign picture uploaded by the signer and a sign picture issued by the server; sends the contract identification of the contract picture to the server, and sends the sign picture to the server in the case that the sign picture uploaded by the signer is received;

Step A6, the server obtains a contract document according to the contract identification, and writes the sign picture into the contract document according to the sign position information.

Preferably, there is digital certificate corresponding to the signer identity information pre-stored in the server;

After Step A6, the method further includes: the server obtains the digital certificate according to the signer identity information, and writes the digital certificate into the contract document.

Preferably, after Step A1 and before Step A2, the method further includes:

Step 601, the server determines whether a format of the contract document is a preset format, if yes, goes to Step A2; otherwise, goes to Step 602;

Step 602, the server determines whether the format of the contract document can be converted into the preset format, if yes, the server converts the format of the contract document into the preset format, goes to Step A2; otherwise, sends information that the format of the contract document is not supportive to the first client.

It needs to be noted that the first client and the second client can be the same client.

Embodiment 2

Figure 2:
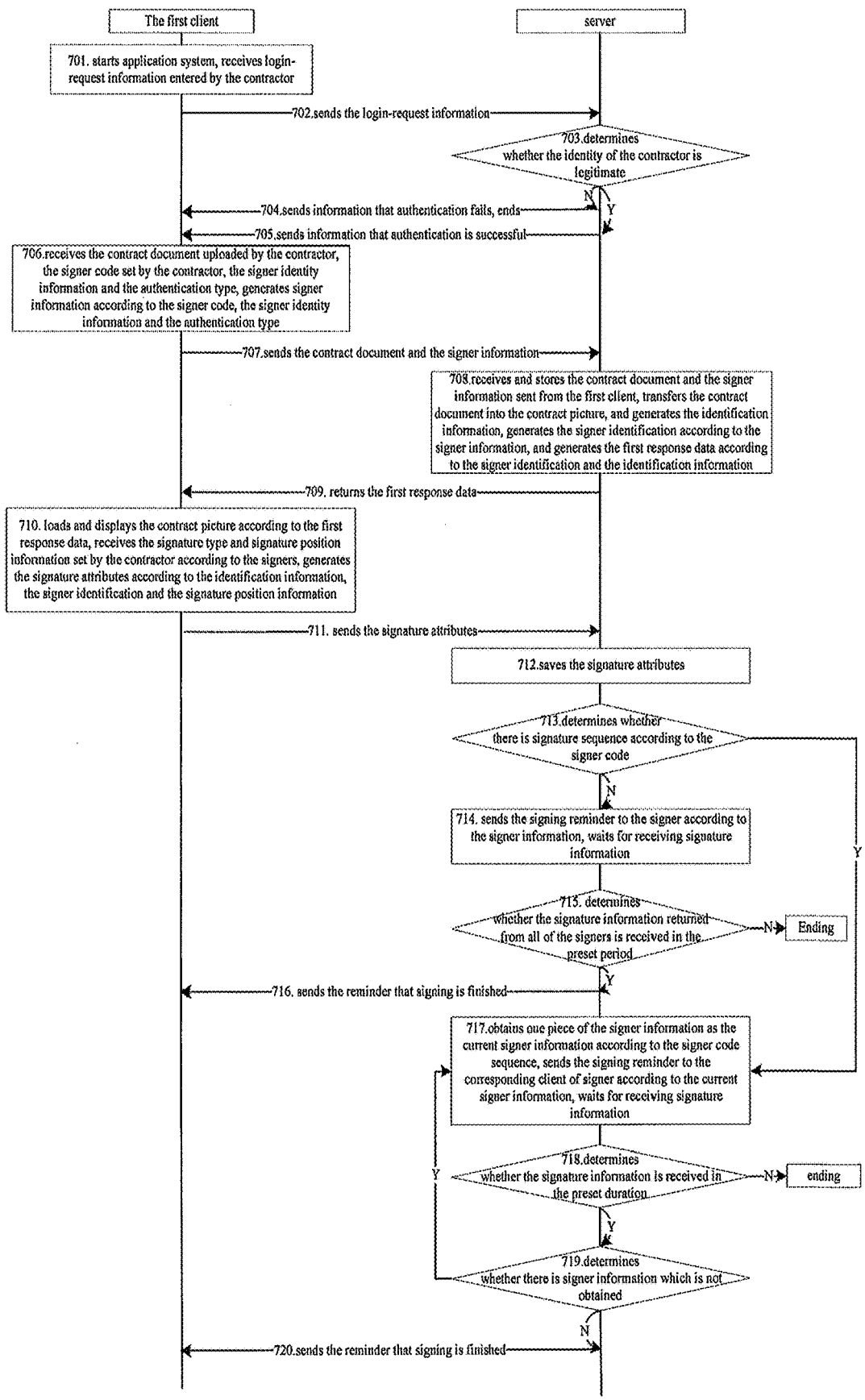
FIG. 2 provides a flow chart of a method for setting up an electronic contract according to Embodiment 2 of the present invention.

As shown in FIG. 2, a method for building an electronic contract specifically includes:

Step 701, the first client starts the application system to receive login-requesting information entered by the contractor.

In Embodiment 2, the login-requesting information includes a username and a password.

Step 702, the first client sends the login-requesting information to the server.

For instance, the login-requesting information sent by the client to the server specifically is {"username", "zhangsan@ftsafe.com","passwd":"123456"}, in which, the zhangsan@ftsafe.com is the username, and the 123456 is the password.

Step 703, the server determines whether the identity of the contractor is legitimate according to the login-requesting information received, if yes, goes to Step 705; otherwise, goes to Step 704, ends the procedure.

The server retrieves information from the database according to the obtained username "zhangsan@ftsafe.com" and the password "123456", the identity of the contractor is authenticated successfully in the case that there is the same information as the obtained username and the password in the database; otherwise, the identity of the contractor is authenticated unsuccessfully, and the procedure is ended.

Step 704, the server sends information that the authentication fails to the first client, the procedure is ended.

Step 705, the server sends information that the authentication is successful.

Step 706, the first client receives a contract document uploaded by the contractor, the signer code set by the contractor, the signer identity information and authentication type, and generates the signer information according to the signer code, the signer identity information and authentication type.

Step 706 can also include: the client receives pre-stored contract document which is not signed chosen by the contractor, the signer code set by the contractor, the signer identity information and authentication type, and generates the signer information according to the signer code, the signer identity information and authentication type.

Specifically, the signer code is configured to mark the sign sequence of the signer.

The signer identity information specifically includes email address, real name and mobile phone number.

Authentication type specifically includes any one of or any combination of a text message, face, finger print or real name.

The contractor can set one signer or multiple of signers, there are two signer in the present Embodiment 2, the first client generates two pieces of signer information which specifically are [{"number":"1", "email": "zhangsan@ftsafe.com", "realname": "Zhang San", "authtype": "1","phonesn": "18201331111"}, {"number": "2", "email":"lisi@ftsafe.com","realname":"Li Si","authtype": "0","phonesn":"18201332222"}].

The signer information of Zhang San specifically is {"number": "1", "email": "zhangsan@ftsafe.com", "realname": "Zhang San","authtype": "1", "phonesn": "18201331111"} in which, the number which means the signer code marks the signing sequence, in the case that the number is 1, the current signer is the first one to sign the contract; the email which means the email address is test@ftsafe.com; the realname which means the real name of the signer is Zhang San; authtype which means authentication type marks authentication type of the signer; in Embodiment 2, it provides multiple of ways of authentication, such as text message, face, finger print or real name, it means that it does not need to authenticate the signer identity in the case that the authtype is 0; it needs to authenticate the signer identity via the text message in the case that the authtype is 1; it needs to authenticate the signer identity via face in the case that the authtype is 2; it needs to authenticate the signer identity via the real name in the case that the authtype is 3. The phonesn which means the cell phone number is 18201331111.

In Embodiment 2, the contract document specifically is shown in FIG. 4.

Step 707, the first client sends the contract document and the signer information to the server.

Step 708, the server receives and stores the contract document and the signer information which are sent from the first client, converts the contract document to a contract picture, and generates identification information; generates a signer identification according to the signer information, and generates a first response data according to the signer identification and the identification information.

In the present Embodiment 2, the identification information includes the contract identification, a document identification, a page number identification and a picture identification.

One contract corresponds to one contract identification; each contract can include one contract document or multiple of contract documents, each contract document corresponds to one document identification; each page of the contract document corresponds to one page number identification.

The server converts the contract documents to the contract pictures according to the page, and each contract picture corresponds uniquely to one picture identification.

For instance, in Embodiment 2, the identification information generated by the server according to the received contract documents specifically includes the contract identification which is 1, the document identification which is 1, the page number identification which is 1, and the picture identification which is 1. The identification information is the only self-incremented serial number generated by the server.

The server generates the signer identification which is 1 according to the signer information which is {"number": "1","email":"zhangsan@ftsafe.com","realname":"Zhang San","authtype": "1", "phonesn": "18201331111"}; and generates the signer identification which is 2 according to the signer information which is {"number":"2","email": "lisi@ftsafe.com","realname":"Li Si","authtype":"0", "phonesn":"18201332222"}.

The first response data specifically is
{"contractinfo":{"contractid":"1"},"addressees":[{"addresseeid":"1","realname":"Zhang San", "email": "zhangsan@ftsafe.com"}, {"addresseeid":"2","realname": "Li Si","email":"lisi@ftsafe. com"}]"docinfo": [{"docid": "1","pageid":"1","pagewidth":"500", "pageheight":"400", "imgid": "1"}]};

in which, contractinfo which means the contract information includes contractid which means the contract unique identification and which is 1. Addressees which means the signer information includes addresseeid which means the signer identification and is 1; realname which means the real name and is Zhang San; email which means the email address and is zhangsan@ftsafe.com. Docinfo which means the document information includes the document identification "docid" which is 1; the page number identification "pageid" which is 1; the page width "pagewidth" which is 500; the page height "pageheight" which is 400; the image identification "imgid" which is 1.

Step 708 further includes the server receives the contract document sent from the first client, and determines whether a format of the contract document is a preset format or can be converted into the preset format by obtaining a document name suffix of the contract document, in the case that the format of the contract document is not the preset format and cannot be converted into the preset format, prompts that the current format is not supportive; in the case that the format of the received contract document is the preset format, stores the current contract document and converts the contract document into the contract picture; in the case that the received contract document format is not the preset format but can be converted into the preset format, converts the contract document into the preset format, stores the converted contract document and converts the converted contract document into the contract picture.

In Embodiment 2, the preset format is PDF format, there are formats, such as TXT, XLS, PPT and DOC, can be converted into the PDF format.

In Embodiment 2, the server determines whether the contract document format is PDF format or can be converted into PDF format by obtaining the suffix of the received contract document, prompts that the current format is not be supportive in the case that the format of the received contract document is not PDF format and cannot be converted into PDF format; stores the current contract document in the case that the format of the received contract document is PDF format, and invokes pdfToImg method to convert the contract document into the contract picture; invokes Msoffice interface to convert the contract document into the contract document of PFD format, stores the contract document of PDF format, and invokes pdfToImg method to convert the contract document of PDF format into the contract picture in the case that the format of the received contract document is not PDF format and is any one of TXT, XLS, PPT, or DOC format. Convert the contract document into the contract picture so as to prevent the contract document from being modifying for the second time.

For instance, the format of the current contract document is DOC format, the server invokes Msoffice interface to convert the contract document into the contract document of PDF format, saves the contract document of PDF format, and invokes pdfToImg method to convert the contract document of PDF format into the contract picture.

Step 709, the server returns the first response data to the first client.

Step 710, the first client loads and displays the contract picture according to the first response data, and receives the sign type and the sign position information which are set by the contractor according to different signer information correspondingly, and generates a sign attribute according to the identification information, the signer identification, the sign position information and the sign type.

In Embodiment 2, the contract picture loaded and displayed by the first client according to the first response data is the contract picture before the contractor sets the sign position, as shown in FIG. 4.

In Embodiment 2, the sign type which can be chosen by the contractor includes sign, signature, date and company name, etc. The sign position information specifically includes: a distance between the sign picture and the top of the page, a distance between the sign picture and the left margin of the page, a width of the sign picture, a height of the sign picture and the document in which the sign picture is, and the number of pages, etc.

FIG. 5 shows a setting page after the contractor sets the sign position. For instance, a sign position for Zhang San is set at a position as shown as a sign frame for Party B in FIG. 5, a sign position for Li Si is set at a position as shown as a sign frame for Party A in FIG. 5. Correspondingly, the sign attribute generated by the first client according to the contract identification, the signer identification, the sign type and the sign position information specifically is:

{"content":[{"docid":"1","pageid":"1","signset":[{addresseeid":"1","fieldtype":"sign","top":"1 00","left":"70","width":"25","height":"20"},{addresseeid":"2","fieldtype":"seal","top":"100","left": "30","width":"25","height":"20"}]}],"contractid":""1"}, in which, the sign attributes include the document identification "docid" corresponding to the sign picture which is 1; the page number identification corresponding to the sign picture which is 1; the signer identification "userid" which is Zhang San; the distance between the sign picture and the page top which is 100 mm; the distance between the sign picture and the page left "left" which is 30 mm; the width of the sign picture which is 25 mm; the height of the sign picture which is 20 mm; the sign type "fieldtype" which is sign, that means the sign type is sign; the contract identification contractid corresponding to the sign picture which is 1.

Step 711, the first client sends the sign attributes to the server.

Step 712, the server saves the sign attributes.

Step 713, the server determines whether there is sign sequence according to the signer code, if yes, goes to Step 717; otherwise, goes to Step 714.

Specifically, the server obtains the signer code from any one of the signer information, and determines whether the signer code is 0, if yes, there is no sign sequence; otherwise, there is sign sequence;

For instance, the server obtains "number": "1" from the signer information, that "number" which is the signer code is 1 means there is a sign sequence.

Step 714, the server sends reminders for signing to all of the signers according to the signer information, and waits for receiving the signing information.

Specifically, the server can obtain the email address from the signing information and send the reminder for signing to the signer via email; or the server can obtain a mobile phone number from the signer information, and send the reminder for signing to the signer via text message.

Step 715, the server determines whether the signing information, which is returned by the signer, is received in a preset time period, if yes, goes to Step 716; otherwise, the procedure ends.

Step 716, the server sends a signing-finished reminder to the first client.

Step 717, the server obtains one piece of signer information as the current signer information according to the sequence of the signer codes, sends the reminder of signing to a corresponding signer client according to the current signer information, and waits for receiving the signing information.

Specifically, the server obtains one piece of signer information according to the sequence of the signer code, and sends the reminder of signing to the signer according to the signer identity information in the signer information.

For instance, in the case that the obtained current signer information is {"number":"1", "email": "zhangsan@ftsafe.com","realname":"Zhang San","authtype": "0", "phonesn": "18201331111"}, the server sends the reminder of signing to the signer whose signer identity information is zhangsan@ftsafe.

Step 718, the server determines whether the signing information is received in the preset time period, if yes, goes to Step 719; otherwise, the procedure ends.

Step 719, the server determines whether there is still signer information which is not obtained, if yes, returns to Step 717; otherwise, goes to Step 720.

Step 720, the server sends the signing-finished reminder to the first client.

FIG. 8 shows a contract picture in which all parties sign.

Figure 3:
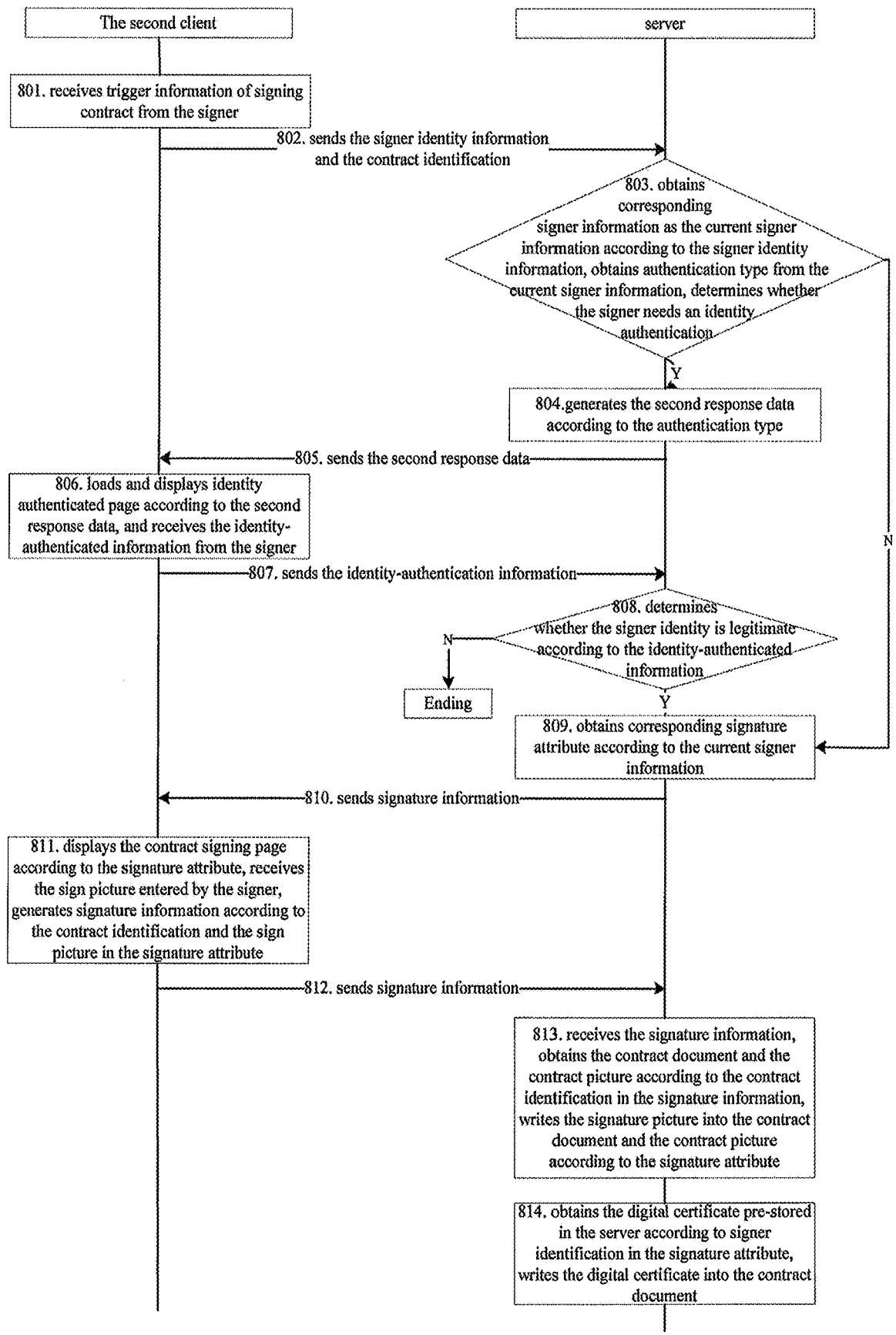
FIG. 3 provides a flow chart of a method for signing an electronic contract according to Embodiment 2 of the present invention.

As shown in FIG. 3, in the case that the current signer is Zhang San, the method for signing an electronic contract specifically includes:

Step 801, the second client receives a trigger signal that the signer starts to sign.

Step 802, the second client sends the signer identity information and the contract identification to the server.

In Embodiment 2, the signer identity information specifically is the contact information of the signer.

Step 801 to Step 802 can be:

in the case that the second client receives the trigger information of signing reminder from the signer, the second client sends the contact information of the signer and the contract identification in the signing reminder to the server.

Step 801 and Step 802 can be replaced by steps from Step 901 to Step 903:

Step 901, the second client starts the application system, receives the username and the password entered by the signer, and sends the username and the password to the server;

specifically, the username can be the signer identity information which is one of email address, real name and mobile phone number;

Step 902, the server determines whether the signer identity is legitimate according to the received username and the password, if yes, sends information that the signer identity is authenticated successfully to the second client, and goes to Step 903; otherwise, sends information that the signer is authenticated unsuccessfully to the second client, and ends the procedure.

Step 903, the second client receives trigger information of unsigned contract from the signer, and sends the contract identification of the unsigned contract to the server, and goes to Step 803.

Step 803, the server obtains a corresponding signer information as the current signer information according to the signer identity information, obtains authentication type from the current signer information, and determines whether the signer needs the identity authentication according to authentication type, if yes, goes to Step 804; otherwise, goes to Step 809.

For instance, the email address sent by the second client to the server is zhangsan@ftsafe.com; the obtained signer information according to the email address is {"number": "1", "email": "zhangsan@ftsafe.com", "realname": "Zhang-San", "authtype": "1", "phonesn": "18201331111"}, "authtype" obtained from the signer information is 1, that means the authentication type is 1. The server determines that the signer is authenticated via facial authentication.

For instance, the email address sent by the second client to the server is lisi@ftsafe.com, the signer information obtained according to the email address is {"number":"2", "email":"lisi@ftsafe.com","realname":"LiSi","authtype": "0","phonesn":"182013322 22"}, "authtype" obtained from the signer information is 0; the authentication type is 0, that means the server determines the signer does not need identity authentication, thus goes to Step 809.

Step 804, the server generates a second response data according to the authentication type.

The link of facial authentication page is made as the second response data in the case that the server determines that the signer needs facial authentication.

Step 805, the server sends the second response data to the second client.

Step 806, the second client loads and displays an identity authentication page according to the second response data, and receives identity authentication information entered by the signer.

For instance, the signer loads and displays a facial authentication page according to the link of facial authentication page, and receives facial information entered by the signer.

Step 807, the second client sends the identity authentication information to the server.

Step 808, the server determines whether the signer identity is legitimate according to the identity authentication information, if yes, goes to Step 809; otherwise, ends the procedure.

The server retrieves from the database according to the identity authentication information, the signer identity is authenticated successfully in the case that there is information same as the identity authentication information in the database; otherwise, the signer identity is authenticated unsuccessfully, and the procedure ends.

Step 809, the server obtains a corresponding signing attribute according to the current signer information.

Specifically, the server obtains the signer identification according to the current signer information, and obtains the corresponding signing attribute according to the signer identification and the contract identification.

In the case that the current signer information specifically is {"number":"1","email":"zhangsan@ftsafe.com","realname":"ZhangSan", "authtype": "1", "phonesn": "182013311111"}, the signer identification obtained according to the current signer information is 1, and when the signer identification is 1, the signing attribute specifically is {"content": [{"docid":"1","pageid":"1","signset":[{addresseeid":"1","fieldtype":"sign","top":"100","left":"70", "width":"25","height":"20"],"contractid":""1"}.

Step 810, the server sends the signing attribute to the second client.

Preferably, Step 810 further includes the server issues a signer picture generated by the server according to the signer identity information to the second client.

Step 811, the second client displays a contract signing page according to the signing attribute, receives the sign picture entered by the signer, and generates the signing information according to the contract identification and the sign picture in the signing attribute.

In the case that the current signer is ZhangSan, the second client displays the contract signature signing page according to the signing attribute, which is the contract signature signing page before ZhangSan signs on it as shown in FIG. 6. The second client displays the contract picture and highlights the sign position according to the signing attribute. The second client receives the signing picture newly set by the signer or uses the signing picture issued by the server; signature data returned is null in the case that the signer uses the signing picture which is already set; the signature data returned is the signing picture newly set in the case that the signer set newly the signing information, in Embodiment 2, the signing information can include signature, signature and seal, ID number, date of signing and name of the company.

Preferably, after the second client displays the signature page according to the signing attribute, before the second client receives the signature data entered by the signer, the method further includes: the second client receives information that whether the signer signs the contract, if confirmation is received, waits for receiving the sign picture entered by the signer; if rejection is received from the signer, returns the rejection to the server; the server sets the current contract document as rejection status, and will not sent the signing reminder to other signers, and ends the procedure.

Step 812, the second client sends signing information to the server.

For instance, the signing information returned from the second client specifically is {"signimg":" ","contractid": ""1"}, in which signing is null, that means the signer uses the sign picture which is set; the contractid, which means the contract identification, is 1.

Step 813, the server receives the signing information, and obtains the contract document and the contract picture according to the contract identification in the signing information, and writes the sign picture into the contract document and the contract picture according to the signing position information in the signing attribute.

In Embodiment 2, because the signer uses the sign picture issued by the server, such as a sign picture or a seal picture, the server defaults to write the sign picture into the contract document when the sign picture returned is null.

For instance, the signing attributes specifically include "content":[{"docid":"1","pageid":"1","signset": [{addresseeid": "1","fieldtype": "sign", "top": "100","left":"70", "width":"25","height":"20"],"contractid":""1"}, in that case, the sign picture is written into a page corresponding to the contract document, in which, the contract identification "contractid" is 1, the document identification is 1, and the page number identification is 1; and the specific position of the sign picture is in the area that has a distance of 100 mm from the top of the page, and has a distance of 70 mm from the left of the page, the width of the sign picture is 25 mm, and the height of the sign picture is 20 mm. As shown in FIG. 7, it is a contract picture after ZhangSan signs it; as shown in FIG. 8, it is the contract picture after both of the signers sign the contract.

Step 814, the server obtains the digital certificate preset in the server according to the signer identification in the signing attribute, and writes the digital certificate into the contract document.

There is a digital signature saved in the server, each signer identification corresponds to one digital certificate, the server obtains the corresponding digital certificate according to the signer information. In Embodiment 2, the format of the contract document specifically is PDF format, the server signs on a digest value of a text of the contract document which is in PDF format, and writes a signing value and the digital certificate into the contract document.

Preferably, after the second client displays the contract signing page according to the signing attribute, and before the signer enters the sign picture, Step 811 further includes:

Step S1, the server receives contract-authenticated information from the second client.

The contract-authenticated information is obtained by taking a picture of the contract picture displayed by the second client, and is uploaded, the second client sends the contract-authenticated information to the server.

Step S2, the server compares the contract-authenticated information received with the contract document, and determines whether the contract-authenticated information is as same as the contract document, if yes, goes to Step 811; otherwise, sends a reminder that the contract is tampered, and ends the procedure.

In Embodiment 2, the received contract picture is compared with the electronic contract uploaded by the contractor or via Optical Character Recognition (OCR). OCR is a process that a shape of a content of picture is determined by detecting a dark or bright mode, and the shape is converted to computer word via a character recognition method.

Furthermore, before Step S2, the method includes the server obtains a resolution of the picture, and determines whether a resolution of the picture obtained by taking a picture by the signer is greater than a preset value, if yes, goes to Step S2; otherwise, sends a prompt that take a picture of the contract again.

Furthermore, before Step S2, the method includes the server executes OCR recognition on the contract picture, counts the number of words obtained by the recognition, determines whether the number of words in the contract picture is more than the preset value, if yes, goes to Step S2; otherwise, sends the prompt that take a picture of the contract again.

Furthermore, in the case that multiple of contract-authenticated information is received in Step S1, executes OCR recognition sequentially according to the receiving sequence of contract picture, the sign picture, which is entered by the signer, is received if multiple of contract-authenticated information is as same as the content of the contract; the procedure ends if the multiple of contract-authenticated information is not as same as the content of the contract.

Embodiment 3

A server for making an electronic contract, includes:

An identification generating module 11, which is configured to receive a contract document sent by the first client, convert the contract document into a contract picture, and generate a contract identification which relates to the contract document and the contract picture;

the identification generating module specifically includes:

a fifth receiving sub-module, which is configured to receive the contract document which is sent by the first client;

a first converting sub-module, which is configured to convert the contract document which is received by the fifth receiving sub-module into the contract picture;

an identification generating sub-module, which is configured to generate the contract identification and the picture identification; the contract identification and the contract document relate to all of the contract picture, and each contract picture corresponds to one picture identification respectively.

The sign position information received by the first receiving module specifically includes coordinate information of the picture identification and the sign position of the sign position in the contract picture.

A first sending module 12, which is configured to send the contract identification and the contract picture generated by the identification generating module 11 to the first client;

a first receiving module 13, which is configured to receive the contract identification, the sign position information and the signer identity information sent from the first client;

the first receiving module 13, specifically includes:

a third receiving sub-module, which is configured to receive the contract identification, the sign position information and the signer information sent from the first client, and to generate a signer identification which relates to the signer information;

the signer information includes: the signer identity information and the signer code; or the signer identity information and authentication type; or the signer identity information, the signer code and authentication type;

a fourth sending sub-module, which is configured to send the signer identification received by the third receiving sub-module to the first client;

a fourth receiving sub-module, which is configured to receive the contract identification, the signer identification and the signer position information sent from the first client.

The second sending module 14, which is configured to send the contract identification, the contract picture which relates to the contract identification and the signer position information to the second client according to the signer identity information received by the first receiving module 13;

in the case that the signer identity information received by the first receiving module 13 specifically is the contact information of the signer, the second sending module 14 specifically includes:

a first sending sub-module, which is configured to send the sign reminder including the contract identification to the second client according to the contact information of the signer received by the first receiving module;

a first receiving sub-module, which is configured to receive the contract identification sent by the second client;

a second sending sub-module, which is configured to obtain the sign position information and the contract picture according to the contract identification and the contact information of the signer received by the first receiving sub-module, and to send the contact picture and the sign position information to the second client.

The signer identity information received by the first receiving module 13 specifically is a username of the signer when he logins the application system, the second sending module 14 specifically includes:

a second receiving sub-module, which is configured to receive the username and the password sent by the second client;

a first determining sub-module, which is configured to determine whether the identity of the signer is legitimate according to the username and the password received by the first receiving module 13;

a third sending sub-module, which is configured to obtain the sign position information and the contract identification according to the username and send the contract identification, the contract picture relating to the contract identification and the sign position information to the second client, in the case that the first determining sub-module determines that the identity of the signer is legitimate.

In the case that the signer information received by the third receiving sub-module includes the signer identity information and the signer code, or the signer identity information, the signer code and the authentication type.

A second sending module 14 specifically includes:

a second determining sub-module, which is configured to determine whether there is a sign sequence according to the signer code in the signer information;

a fifth sending sub-module, which is configured to send the contract identification to all of the second clients according to the signer identity information in the signer information in the case that the second determining sub-module determines there is not the sign sequence;

a first obtaining sub-module, which is configured to obtain the signer information as a current signer information orderly according to the signer code in the case that the second determining sub-module determines that there is sign sequence; and to obtain sequentially the signing information as the current signing information according to the signer code in the case that the first determining module determines that there is signer information which has not been obtained;

a sixth sending sub-module, which is configured to send the contract identification, the contract picture and the signer position information to the second client according to the signer identity information in the current signer information obtained by the first obtaining sub-module;

the server further includes: a first determining module, which is configured to determine whether there is signer information which is not been obtained.

The signer information received by the third receiving sub-module includes the signer identity information and authentication type; or the signer identity information, the signer code and authentication type;

the server further includes:

a third sending module, which is configure to obtain authentication type from the signer information which is received by the third receiving sub-module, and send a link of an authentication page to the second client according to authentication type;

a second determining module, which is configured to receive identity authentication information sent from the second client, and to determine whether the signer identity is legitimate according to the identity authentication information;

a second sending module 14, which is specifically configured to send the contract identification, the contract picture relating to the contract identification and the signer position information to the second client according to the signer identity information received by the first receiving module 13 in the case that the second determining module determines that the signer identity is legitimate;

a fourth sending module, which is configured to send information that the identity is authenticated unsuccessfully to the second client in the case that the second determining module determines the signer identity is illegitimate.

Specifically, authentication type in the signer information received by the third receiving sub-module specifically includes the facial authentication, real-name authentication, fingerprint authentication or text message authentication.

The second receiving module 15 is configured to receive the contract identification sent from the second client, and to receive the contract identification and the sign picture sent from the second client;

a signing module 16, which is configured to write the sign picture pre-stored in the server into the contract document which relates to the contract identification according to the sign position information in the case that the second receiving module 15 receives the contract identification, and to write the sign picture pre-stored in the server into the contract document in the case that the second receiving module receives the contract identification and the sign picture.

Preferably, the server further includes:

a storing module, which is configured to store a digital certificate corresponding to the signer identity information; and a digital-certificate-writing module, which is configured to obtain the digital certificate from the storing module according to the signer identity information, and to write the digital certificate into the contract document obtained by the signing module.

Furthermore, the server includes:

a third receiving module, which is configured to receive a contract authentication picture sent from the second client;

a third determining module, which is configured to obtain the contract document according to the contract identification received by the second receiving module, to compare the contract authentication picture received by the third receiving module with the contract document and determine whether the contract authentication picture is the same as the contract document;

the third determining module can include:

a fourth determining sub-module, which is configured to determine whether resolution of the contract authentication picture received by the third receiving module is greater than a preset value;

a fifth determining sub-module, which is configured to compare the contract authentication picture received by the third receiving module with the contract document in the case that the fourth determining sub-module determines that the resolution of the contract authentication picture received by the third receiving module is greater than the preset value, and determines whether the contract authentication picture is as same as the contract document; and an eighth sending sub-module, which is configured to send information that the contract authentication picture is not qualified to the second client in the case that the fifth determining sub-module determines that the resolution of the contract authentication picture received by the third receiving module is not greater than the preset value.

Correspondingly, the signing module is specifically configured to write the sign picture received by the second receiving module into the contract document obtained by the third determining module according to the sign position information in the case that the third determining module determines that the contract authentication picture is as same as the contract document;

the third determining module can also include:

a sixth determining sub-module, which is configured to operate optical character recognition on the contract authentication picture received by the third receiving module, to make words statistics on the words which is obtained by recognition, and to determine whether the number of the words in the contract authentication picture is more than a preset value;

a seventh determining sub-module, which is configured to compare the contract authentication picture received by the third receiving module with the contract document in the case that the sixth determining sub-module determines that the number of words in the contract authentication picture received by the third receiving module is more than the preset value, and to determine whether the contract authentication picture is as same as the contract document;

a ninth sending sub-module, which is configured to send information that the contract authentication picture is not qualified to the second client in the case that the seventh determining sub-module determines that the number of the words in the contract authentication picture received by the third receiving module is not more than the preset value; and a sixth sending module, which is configured to send information that the contract is falsified to the second client in the case that the third determining module determines that the contract authentication picture is not as same as the contract document.

The above embodiments are preferable detailed description of embodiments, all of changes and substitutes by technicians in this field without innovative work belongs to scope of protection of the present invention.

The invention claimed is:

1. A method for online electronically signing an electronic contract between two different clients, wherein said method comprises the following steps:

B1) receiving, by a server, a contract document sent from a first client, converting the contract document to a contract picture, generating a contract identification which relates to the contract document and the contract picture, and sending the contract identification and the contract picture to the first client;

B2) receiving, by the server, the contract identification, sign position information and signer identity information which are sent from the first client, and sending the contract identification, the contract picture and the sign position information to a second client according to the signer identity information; and B3) receiving, by the server, the contract identification sent from the second client; writing a sign picture into the contract document relating to the contract identification according to the sign position information in the case that the server receives the sign picture sent from the second client; and writing a sign picture preset in the server into the contract document in the case that the server does not receive the sign picture sent from the second client, whereby the method prevents parties who need to sign a contract from being limited by time or location through signing the electronic contract;

the method provides a more convenient and faster way for signing a contract;

the method is also resource-friendly and can protect the contract from being tampered in the process of being signed.

2. The method as claimed in claim 1, wherein the signer identity information received by the server in Step B2 specifically is signer contact information;

sending the contract identification, and the contract picture and the signer position information relating to the contract identification to the second client specifically comprises the following steps:

801) sending, by the server, a signing reminder which includes the contract identification to the second client according to the signer contract information; and 802) receiving, by the server, the contract identification sent from the second client, and obtaining the sign position information and a contract picture according to the contract identification and the signer contact information, and sending the contract picture and the sign position information to the second client.

3. The method as claimed in claim 1, wherein the signer identity information received by the server in Step B2 specifically is a username used by a signer when he/she logins an application system;

sending the contract identification, and the contract picture and the signer position information relating to the contract identification to the second client according to the signer identity information specifically comprises:

receiving, by the server, a username and a password sent from the second client, obtaining the sign position information and the contract identification according to the username after the server determines that the signer identity is legitimate according to the username and the password, and sending the contract identification, and the contract picture and the sign position information relating to the contract identification to the second client.

4. The method as claimed in claim 1, wherein Step B2 specifically comprises the following steps:

901) receiving, by the server, the contract identification, the sign position information and the signer identity information sent from the first client; generating a signer identification relating to the signer information, and sending the signer identification to the first client;

in which the signer information comprises the signer identity information and a signer code, or the signer identity information and an authentication type, or the signer identity information, the signer code and the authentication type; and 902) receiving, by the server, the contract identification, the signer identification and the sign position information sent from the first client.

5. The method as claimed in claim 4, wherein the signer information comprises the signer identity information and the signer code, or the signer identity information, the signer code and the authentication type;

sending the contract identification, the contract picture and the signer position information relating to the contract identification to the second client according to the signer identity information specifically comprises the following steps:

A01) determining, by the server, whether there is a signing sequence according to the signer code in the signer information, if yes, going to Step A03, otherwise, going to Step A02;

A02) sending, by the server, the contract identifications to all of the second client according to the signer identity information in multiple of the signer information; and A03) obtaining, by the server, the signer information as current signer information according to the sequence of the signer code, and sending the contract identification, the contract picture and the signer position information to the second client according to the signer identity information in the current signer information; and after Step B3, the method further comprises: determining, by the server, whether there is any signer information which is not obtained, if yes, returning to Step A03, otherwise, ending the procedure.

6. The method as claimed in claim 4, wherein
the signer information comprises the signer identity information and the authentication type, or the signer information comprises the signer identity information, the signer code and the authentication type;

after Step B2 and before Step B3, the method further comprises the following steps:

B01) obtaining, by the server, the authentication type from the signer information, and sending a link of an authentication page to the second client according to the authentication type; and B02) receiving, by the server, the identity authentication information sent from the second client, determining whether the signer identity is legitimate according to the identity authentication information, if yes, executing Step B3; otherwise, sending a reminder that the identity is authenticated unsuccessfully to the second client, then ending the procedure.

7. The method as claimed in claim 1, wherein Step B1 specifically comprises converting, by the server, the contract document into the contract picture according to a preset converting relationship, generating the contract identification, generating one picture identification corresponding to each contract picture respectively, relating the contract identification and the contract document with all of the contract pictures, and sending the contract identification, the picture identification and the contract picture to the first client; and the signer position information received by the server specifically comprises coordinate information of the picture identification and the sign position in the contract picture in which the sign position is.

8. The method as claimed in claim 1, wherein said method comprises:

pre-storing, by the server, a digital certificate corresponding to the signer identity information; and after Step B3, the method further comprises obtaining, by the server, the digital certificate according to the signer identity information, and writing the digital certificate into the contract document.

9. The method as claimed in claim 1, wherein after Step B2 and before Step B3, said method further comprises the following steps:

D01) receiving, by the server, a contract-authenticated picture sent from the second client; and D02) obtaining, by the server, the contract document according to the contract identification, comparing the contract-authenticated picture with the contract document, and determining whether the content of the contract-authenticated picture is just the same as the content of the contract document, if yes, executing Step B3; otherwise, sending a reminder that the contract is tampered to the second client, then ending the procedure.

10. The method as claimed in claim 9, wherein after Step D01 and before Step D02, said method further comprises determining, by the server, whether a resolution of the contract-authenticated picture is higher than a preset value, if yes, executing Step D02; otherwise, sending a reminder that the contract-authenticated picture is not qualified to the second client.

11. The method as claimed in claim 9, wherein after Step D01 and before Step D02, said method further comprises operating Optical Character Recognition on the contract-authenticated picture, making number statistic of words obtained via Optical Character Recognition, determining whether the number of words in the contract-authenticated picture is greater than a preset value, if yes, executing Step D02; otherwise, sending the reminder that the contract-authenticated picture is unqualified to the second client.

12. A server for online electronically signing an electronic contract between two different clients, wherein said server comprises:

an identification generating module, which is configured to receive a contract document sent from the first client, convert the contract document into a contract picture, and generate a contract identification which relates to the contract document and the contract picture;

a first sending module, which is configured to send the contract identification and the contract picture generated by the identification generating module to the first client;

a first receiving module, which is configured to receive the contract identification, the sign position information and the signer identity information sent from the first client;

a second sending module which is configured to send the contract identification, the contract picture relating to the contract identification and the signer position information to the second client according to the signer identity information received by the first receiving module;

a second receiving module, which is configured to receive the contract identification sent from the second client, and further to receive the contract identification and a sign picture sent from the second client; and a signing module, which is configured to write a sign picture pre-stored in the server into a contract document relating to the contract identification according to sign position information in the case that the second receiving module receives the contract identification, and write the sign picture pre-stored in the server into the contract document in the case that the second receiving module receives the contract identification and the sign picture.

13. The server as claimed in claim 12, wherein
the signer identity information received by the first receiving module specifically is a signer contact information;
the second sending module specifically includes:
a first sending sub-module which is configured to send the sign reminder including the contract identification to the second client according to the contact information of the signer received by the first receiving module;
a first receiving sub-module which is configured to receive the contract identification sent by the second client; and
a second sending sub-module which is configured to obtain the sign position information and the contract picture according to the contract identification and the contact information of the signer received by the first receiving sub-module, and to send the contract picture and the sign position information to the second client.

14. The server as claimed in claim 12, wherein
the signer identity information received by the first receiving module specifically is the username used by the signer when he/she logins the application system;
the second sending module specifically comprises:
a second receiving sub-module, which is configured to receive the username and the password sent from the second client;
a first determining sub-module, which is configured to determine whether the signer identity is legitimate according to the username and the password received by the first receiving module; and
a third sending sub-module, which is configured to obtain the sign position information and the contract identification according to the username in the case that the first determining sub-module determines the signer identity is legitimate, and send the contract identification, the contract picture relating to the contract identification and the sign position information to the second client.

15. The server as claimed in claim 12, wherein
the first receiving module specifically comprises:
a third receiving sub-module, which is configured to receive the contract identification, the sign position information and the signer information sent from the first client, and generate the signer identification relating to the signer information;
in which the signer information comprises the signer identity information and the signer code; or the signer identity information and the authentication type; or the signer identity information, the signer code and the authentication type;
a fourth sending sub-module, which is configured to send the signer identification received by the third receiving sub-module to the first client; and
a fourth receiving sub-module, which is configured to receive the contract identification, the signer identification and the sign position information sent by the first client.

16. The server as claimed in claim 15, wherein
the signer information received by the third receiving sub-module comprises the signer identity information and the signer code, or the signer information received by the third receiving sub-module comprises the signer identity information, the signer code and the authentication type;
the second sending module specifically comprises:
a second determining sub-module, which is configured to determine whether there is any signing sequence according to the signer code in the signer information;
a fifth sending sub-module, which is configured to send the contract identification to all of the second clients according to the signer identity information in the signer information in the case that the second determining sub-module determines there is no signing sequence;
a first obtaining sub-module, which is configured to obtain the signer information as the current signer information according to the sequence of the signer code in the case that the second determining sub-module determines there is a signing sequence; and obtain the signer information as the current signer information according to the sequence of the signer code in the case that the first determining module determines there is signer information which is not obtained;
a sixth sending sub-module, which is configured to send the contract identification, the contract picture and the signer position information to the second client according to the signer identity information in the current signer information obtained by the first obtaining sub-module; and
the server further comprises a first determining module which is configured determine whether there is any signer information which is not obtained.

17. The server as claimed in claim 15, wherein
the signer information received by the third receiving sub-module comprises the signer identity information and the authentication type, or the signer information received by the third receiving sub-module comprises the signer identity information, the signer code and the authentication type;
the server further comprises:
a third sending module, which is configured to obtain an authentication type from the signer information received by the third receiving sub-module, and send a link of authentication page to the second client according to the authentication type;
a second determining module, which is configured to receive identity-authenticated information, and determine whether the signer identity is legitimate according to the identity-authenticated information;
the second sending module is specifically configured to send the contract identification, the contract picture relating to the contract identification and the signer position information to the second client according to the signer identity information received by the first receiving module in the case that the second determining module determines that the signer identity is legitimate; and
a fourth sending module, which is configured to send a reminder that the identity is authenticated unsuccessfully to the second client in the case that the second determining module determines the signer identity is illegitimate.

18. The server as claimed in claim 12, wherein the identification-generating module specifically comprises:
a fifth receiving sub-module, which is configured to receive the contract document sent from the first client;
a first converting sub-module, which is configured to convert the contract document received by the fifth receiving sub-module into the contract picture according to the preset converting relationship;
an identification generating sub-module, which is configured to generate the contract identification and the picture identification; and relate the contract identification with the contract document and all of the contract pictures, in which each contract picture corresponds to one picture identification; and
the sign position information received by the first receiving module specifically comprises the coordinate information of the picture identification of the contract picture, in which the sign is, and the sign position.

19. The server as claimed in claim 12, wherein said server comprises:
a storing module, which is configured to store the digital certificate corresponding to the signer identity information; and
a digital certificate writing module, which is configured to obtain the digital certificate from the storing module according to the signer identity information, and write the digital certificate into the contract document obtained by the signing module.

20. The server as claimed in claim 12, wherein the identification generating module specifically comprises:
- a sixth receiving sub-module, which is configured to receive the contract document sent by the first client;
- a second determining sub-module, which is configured to determine whether the format of the contract document received by the sixth receiving sub-module is with a preset format;
- a third determining sub-module, which is configured to determine whether the format of the contract document can be converted to the preset format in the case that the second determining sub-module determines the format of the contract document is not the preset format;
- a second converting sub-module, which is configured to convert the contract document into the contract picture in the case that the second determining sub-module determines the format of the contract document is the preset format; and convert the format of the contract document into the preset format in the case that the third determining sub-module determines the format of the contract document can be converted into the preset format, and convert the contract document which is converted into the preset format into the contract picture; and
- a seventh sending sub-module, which is configured to send a reminder that the format of the contract document is not supportive to the first client in the case that the third determining sub-module determines the format of the contract document cannot be converted into the preset format.

21. The server as claimed in claim 12, wherein said server further comprises:
- a third receiving module, which is configured to receive the contract-authenticated picture from the second client;
- a third determining module, which is configured to obtain the contract document according to the contract identification received by the second receiving module, compare the contract-authenticated picture received by the third receiving module with the contract document, and determine whether the content of the contract-authenticated picture is just the same as the content of the contract document;
- the signing module is specifically configured to write the sign picture received by the second receiving module into the contract document obtained by the third determining module according to the sign position information in the case that the third determining module determines that the content of the contract-authenticated picture is just the same as the content of the contract document; and
- a sixth sending module, which is configured to send the reminder that the contract is tampered to the second client in the case that the third determining module determines that the content of the contract-authenticated picture is different from the content of the contract document.

22. The server as claimed in claim 21, wherein the third determining module specifically comprises:
- a sixth determining sub-module, which is configured to operate optical character recognition on the contract-authenticated picture received by the third receiving module, and make statistic of the number of words which is recognized, and determine whether the number of words in the contract-authenticated picture is more than the preset value;
- a seventh determining sub-module, which is configured to compare the contract-authenticated picture received by the third determining module with the contract document in the case that the sixth determining sub-module determines that the number of words in the contract-authenticated picture is more than the preset value, and determine whether the contents are same as each other; and
- a ninth sending sub-module, which is configured to send the reminder that the contract-authenticated picture is not qualified to the second client in the case that the seventh determining sub-module determines that the number of words in the contract-authenticated picture is not more than the preset value.

\* \* \* \* \*